(12) United States Patent
Kim et al.

(10) Patent No.: US 9,974,019 B2
(45) Date of Patent: May 15, 2018

(54) ELECTRONIC DEVICE AND METHOD FOR RECEIVING GEO-FENCE SERVICE WITH LOW POWER CONSUMPTION

(71) Applicant: Samsung Electronics Co., Ltd., Gyeonggi-do (KR)

(72) Inventors: Min-June Kim, Seoul (KR); Young-Ae Kang, Gyeonggi-do (KR); Dae-Jin Kim, Seoul (KR); Jong-Man Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 35 days.

(21) Appl. No.: 14/219,577

(22) Filed: Mar. 19, 2014

(65) Prior Publication Data
US 2014/0302879 A1  Oct. 9, 2014

(30) Foreign Application Priority Data

Apr. 8, 2013 (KR) .................. 10-2013-0038263

(51) Int. Cl.
*H04W 52/02* (2009.01)
*H04W 64/00* (2009.01)
(Continued)

(52) U.S. Cl.
CPC ....... *H04W 52/0225* (2013.01); *G01S 5/0263* (2013.01); *G01S 19/34* (2013.01);
(Continued)

(58) Field of Classification Search
CPC ....... H04W 4/021; H04W 4/02; H04W 64/00; H04W 4/025; H04W 4/027; H04W 52/0225; G01S 5/0252; H04M 1/72572
See application file for complete search history.

(56) References Cited

U.S. PATENT DOCUMENTS 8,229,473 B1  7/2012  De La Rue
2003/0148771 A1  8/2003  de Verteuil
(Continued)

FOREIGN PATENT DOCUMENTS

| CN | 102027792 A | 4/2011 |
| CN | 102938927 A | 2/2013 |
| WO | 2010/123655 A1 | 10/2010 |

OTHER PUBLICATIONS

European Search Report dated Apr. 15, 2016.
(Continued)

*Primary Examiner* — Charles Appiah
*Assistant Examiner* — Margaret G Mastrodonato
(74) *Attorney, Agent, or Firm* — Cha & Reiter, LLC

(57) ABSTRACT

A method used by an electronic device receiving a geo-fence service, determines whether a current position of the electronic device, determined using a cellular positioning system (CPS), is located within a first distance from a central point of a geo-fence service area. In response to determining that the current position is located within the first distance, the current position is determined using a Wi-Fi positioning system (WPS) and it is further determined whether the WPS determined current position is located within a second distance from the central point of the geo-fence service area. In response to the determination the current position is located within the second distance, it is determined whether the current position calculated using a global positioning system (GPS), is located within a boundary of a geo-fence service area.

14 Claims, 10 Drawing Sheets

(51) Int. Cl.
    *H04W 4/02*     (2018.01)
    *G01S 19/48*     (2010.01)
    *G01S 5/02*     (2010.01)
    *G01S 19/34*     (2010.01)

(52) U.S. Cl.
    CPC ............. *G01S 19/48* (2013.01); *H04W 4/021* (2013.01); *H04W 4/025* (2013.01); *H04W 64/00* (2013.01); *G01S 5/0252* (2013.01); *Y02D 70/00* (2018.01); *Y02D 70/1222* (2018.01); *Y02D 70/1262* (2018.01); *Y02D 70/142* (2018.01); *Y02D 70/144* (2018.01); *Y02D 70/146* (2018.01); *Y02D 70/164* (2018.01)

(56) References Cited

U.S. PATENT DOCUMENTS

| | | |
|---|---|---|
| 2009/0312032 A1 | 12/2009 | Bornstein et al. |
| 2011/0151839 A1 | 6/2011 | Bolon et al. |
| 2012/0115512 A1 | 5/2012 | Grainger et al. |
| 2012/0309409 A1* | 12/2012 | Grosman .......... H04M 1/72572 455/456.1 |
| 2013/0093627 A1 | 4/2013 | Cosman |
| 2014/0187256 A1* | 7/2014 | Modali ................ H04W 4/027 455/456.1 |

OTHER PUBLICATIONS

European Search Report, dated Mar. 22, 2017.
European Search Report dated Oct. 19, 2017.
Chinese Search Report dated Dec. 18, 2017.

* cited by examiner

ELECTRONIC DEVICE AND METHOD FOR RECEIVING GEO-FENCE SERVICE WITH LOW POWER CONSUMPTION

CLAIM OF PRIORITY

This application claims priority under 35 U.S.C. § 119 to an application filed in the Korean Intellectual Property Office on Apr. 8, 2013 and assigned Serial No. 10-2013-0038263, the contents of which are incorporated herein by reference.

BACKGROUND

1. Technical Field

The present system concerns an electronic device for receiving a geo-fence service with low power consumption, for example.

2. Description of the Related Art

Known electronic devices include a geo-fence service that requires determination of whether a user is located within a geo-fence (geographical) service area and the electronic device may receive the geo-fence service data. However, known electronic device measure the position of the electronic device using a GPS, involving substantial power consumption within the electronic device. It is desirable to employ a different position determination system without comprehensive use of an electronic device GPS that reduces power consumption in the electronic device.

SUMMARY

A system selectively uses a CPS, a WPS and a GPS to measure the position of an electronic device advantageously reducing battery consumption and restricting activation and power-up of a GPS function in response to determination that the electronic device is located near a geo-fence service area.

A method used by an electronic device receiving a geo-fence service, determines whether a current position of the electronic device, determined using a cellular positioning system (CPS), is located within a first distance from a central point of a geo-fence service area. In response to determining that the current position is located within the first distance, the current position is determined using a Wi-Fi positioning system (WPS) and it is further determined whether the WPS determined current position is located within a second distance from the central point of the geo-fence service area. In response to the determination the current position is located within the second distance, it is determined whether the current position calculated using a global positioning system (GPS), is located within a boundary of a geo-fence service area.

In a feature, the method determines whether serving cell information of a cell currently serving information to the electronic device matches an item of cell information of one or more base stations located within the geo-fence service area and in response to a match, displays information indicating that the electronic device is located within the geo-fence service area. The method also determines whether serving cell information matches an item of cell information of one or more base stations located within the geo-fence service area and in response to an absence of a match, indicates that the serving cell information does not match. The method also switches to an idle mode when it is determined that the current position is located outside of the first distance and in the idle mode, it is determined whether the serving cell information is changed and in response to a determined change, switches to a wake-up mode from the idle mode. In response to determining that the current position calculated using the GPS is located within the boundary of the geo-fence service area, the method displays information indicating that the electronic device is located within the geo-fence service area.

In another feature, a method used by an electronic device which receives a geo-fence service, comprises steps of, (1) determining whether serving cell information of a cell currently serving information to the electronic device matches an item of cell information of one or more base stations located within a predetermined range and outside of a geo-fence service area, (2) in response to a determined match, determining whether the serving cell information matches an item of cell information of one or more base stations located within the geo-fence service area and (3) in response to an absence of a match of the serving cell information and the base station cell information, determining whether the current position is located within the geo-fence service area using a global positioning system (GPS).

In an additional feature, the method receives, from a server, the serving cell information and cell information of one or more base stations located within the geo-fence service area and cell information of one or more base stations located within a predetermined range and outside of the geo-fence service area. The method switches to an idle mode in response to determining that the serving cell information matches an item of cell information of one or more base stations located within the predetermined range and outside of the geo-fence service area and in the idle mode, determines whether the serving cell information is changed and in response to determining that the serving cell information is changed, switches to a wake-up mode from the idle mode and repeatedly performs the step (1). When it is determined that the serving cell information matches an item of cell information of one or more base stations located within the geo-fence service area, information is displayed indicating that the electronic device is located within the geo-fence service area. When it is determined that the current position is located within the geo-fence service area, information is displayed indicating that the electronic device is located within the geo-fence service area. When it is determined that the current position is not located within the geo-fence service area, step (3) is repeated.

In yet another feature, an electronic device which receives a geo-fence service, includes a processor unit and a memory. The processor unit, determines whether a current position calculated using a cellular positioning system (CPS) is located within a first distance from a central point of a geo-fence service area, in response to determining that the current position is located within the first distance, determines the current position using a Wi-Fi positioning system (WPS), determines whether the WPS determined current position is located within a second distance from the central point of the geo-fence service area, and in response to the determination the current position is located within the second distance, determines whether the current position calculated using a global positioning system (GPS), is located within a boundary of a geo-fence service area. The memory stores information processed by the processor unit.

In other features, the electronic device includes a touch-screen for displaying information indicating that the electronic device is located within the geo-fence service area in response to determining that the serving cell information matches an item of cell information of one or more base stations located within the geo-fence service area, wherein the processor unit determines whether the serving cell information matches an item of cell information of one or more base stations located within the geo-fence service area. The processor unit determines whether the serving cell information matches an item of cell information of one or more base stations located within the geo-fence service area, and in response to an absence of a match of the serving cell information and the base station cell information, indicates the absence of a match. The processor unit switches to an idle mode and determines whether the serving cell information is changed in response to determining that the current position is located outside of the first distance, switches to a wake-up mode from the idle mode in response to determining that the serving cell information is changed, and repeatedly performs determination of whether the current position calculated using the CPS is located within the first distance from a central point of the geo-fence service area.

In yet additional features, the processor unit repeatedly performs determination of whether the current position calculated using the CPS is located within the first distance from the central point of the geo-fence service area in response to determining that the current position calculated using the WPS is located outside of the second distance. Also, the processor unit repeatedly performs determination of whether the current position calculated using the WPS is located within the second distance from the central point of the geo-fence service area in response to determining that a current position calculated using a GPS is located outside of a boundary of the geo-fence service area. A touchscreen displays information indicating that the electronic device is located within the geo-fence service area when it is determined that the current position calculated using the GPS is located within the boundary of the geo-fence service area.

In a further feature, an electronic device which receives a geo-fence service, comprises a processor unit and a memory. The processor unit determines whether serving cell information matches an item of cell information of one or more base stations located within a predetermined range outside of a geo-fence service area, in response to determining that the serving cell information matches an item of cell information, determines whether the serving cell information matches an item of cell information of one or more base stations located within the geo-fence service area, and in response to determining that the serving cell information matches an item of cell information of one or more base stations located within the geo-fence service area, determines whether the current position is located within the geo-fence service area by using a GPS. The memory stores information processed by the processor unit.

In another feature, a communication module receives, from a server, serving cell information and cell information of one or more base stations located within the geo-fence service area and cell information of one or more base stations located within a predetermined range and outside of the geo-fence service area.

DETAILED DESCRIPTION

A system will be described herein below with reference to the accompanying drawings. In the following description, detailed descriptions of well-known functions or configurations will be omitted since they would unnecessarily obscure the subject matters of the present invention. A geo-fence as used herein comprises a virtual perimeter determining an associated real-world geographic area employed by a location-based service (LBS). A serving cell comprises a cellular network cell area currently serving information to an electronic device concerned.

Figure 1:
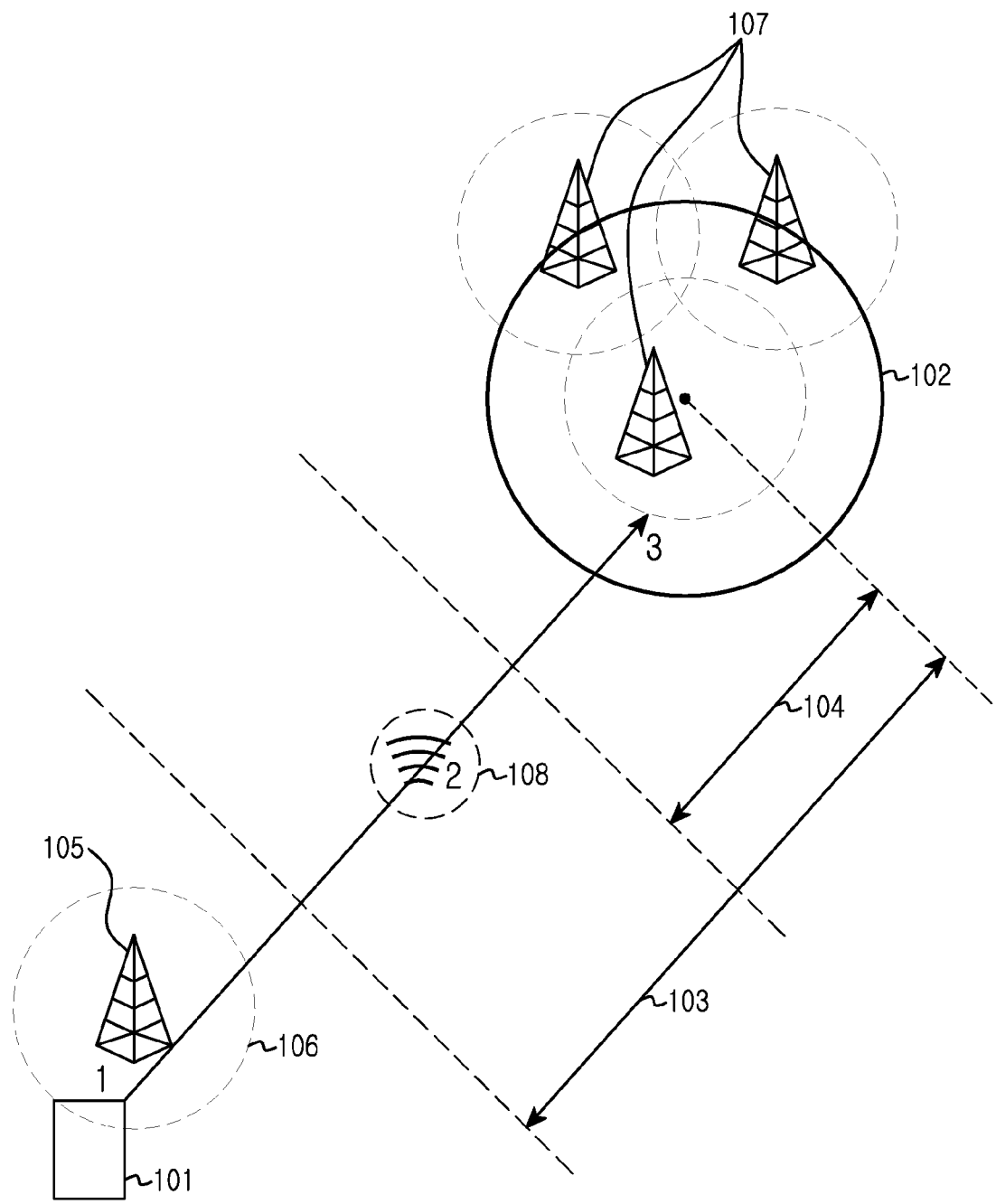
FIG. 1 shows an electronic device system for receiving a geo-fence service with low power consumption according to invention principles.

FIG. 1 shows an electronic device system for receiving a geo-fence service with low power consumption where electronic device 101 is receiving a geo-fence service and is located at a point "1" outside of a currently set geo-fence service area 102. In addition, a first distance 103 and a second distance 104 are set from the central point of the geo-fence service area 102. First, when the electronic device 101 receives an instruction for starting a geo-fence service, the electronic device 101 may receive data from a database stored in a server. Herein, the database stored in the server may include cell information, Access Point (AP) information, position information, accuracy information, for example. That is, the electronic device 101 may receive information including cell information, AP information, position information, and accuracy information, for example from the server.

Thereafter, the electronic device 101 may calculate the current position of the electronic device 101 using a Cellular Positioning System (CPS) by comparing the information received from the server with current serving cell information of the electronic device. For example, electronic device 101 is currently located at the point "1" and is connected to "a first base station 105", and a cell managed by "the first base station 105" is "a first cell 106" managed by "the first base station 105" as a serving cell. Thereafter, the electronic device 101 may perform comparison with position information according to the cell information received from the server and identify that the electronic device 101 is currently located at the point "1".

Thereafter, the electronic device 101 may determine whether the calculated current position of the electronic device 101 is located within the first distance 103. Since the current position of the electronic device 101 is located outside of the first distance 103, the electronic device 101 may identify that the calculated current position of the electronic device 101 is located outside of the first distance 103.

The electronic device 101 that has identified that the calculated current position of the electronic device 101 is located outside of the first distance 103 may switch to an idle mode and determine whether the serving cell information is changed. When the position of the electronic device 101 is changed and the electronic device 101 determines that the serving cell information is changed, the electronic device 101 may switch the mode of the electronic device 101 to a wake-up mode and repeatedly perform the operation of calculating the current position using the CPS. However, when the electronic device 101 has determined that the serving cell information is not changed, the electronic device 101 may repeatedly perform determination of whether the serving cell information is changed. That is, an existing electronic device that receives the geo-fence service calculates the current position of the electronic device using a global positioning system (GPS) regardless of the position of the electronic device. Since tracking the position using the GPS requires operations of amplifying and interpreting radio waves received through a GPS antenna by using satellite information received through the radio waves about every 1 second in the electronic device reducing battery charge substantially.

However, since the electronic device 101 calculates the position of the electronic device 101 using the CPS without using GPS from the beginning in order to calculate the current position of the electronic device 101, the electronic device 101 advantageously reduces battery consumption in the electronic device 101. Specifically, where the current position of the electronic device 101 is calculated initially using the CPS and it is determined that the calculated current position of the electronic device 101 is located outside of the first distance 103, since the current position of the electronic device 101 is calculated when the serving cell is changed, the battery consumption of the electronic device 101 is reduced. That is, when it is determined that the current position of the electronic device 101 is a substantial distance from the geo-fence service area 102, the battery consumption may be reduced by using the CPS for acquiring the approximate position of the electronic device 101 although less accurate than using the GPS.

When it is determined that the current position calculated using the CPS by the electronic device 101 is located within the first distance 103, the electronic device 101 may determine which cell information among pieces of cell information of one or more base stations 107 located within the geo-fence service area 102 is identical to the serving cell information. Specifically, when the electronic device 101 determines that the electronic device 101 is located within the first distance 103, the electronic device 101 determines whether the electronic device 101 is located within the geo-fence service area 102 and if so displays information (zoom in) indicating that the electronic device 101 is located within the geo-fence service area 102 on the touchscreen of the electronic device 101 and immediately ends processes. However, when it is determined that the electronic device 101 is not located within the geo-fence service area 102, the electronic device 101 may identify that the electronic device 101 is located within the first distance 103 and calculates the current position using a Wi-Fi Positioning System (WPS). That is, when the electronic device 101 moves from the point "1" to point "2", the electronic device 101 may calculate the current position of the electronic device 101 using the WPS. Specifically, the electronic device 101 scans WiFi access points (AP) periodically and acquires AP information. Thereafter, the electronic device 101 may compare the acquired AP information with AP information received from the server and calculates the current position of the electronic device 101. For example, upon the electronic device 101 moving from the point "1" to the point "2", the current position of the electronic device 101 is located within the first distance 103, and the electronic device 101 is currently connected to "a first AP 108". The electronic device 101 identifies that the electronic device is connected to "the first AP 108" as a result of scanning of neighboring APs and receives information identifying "the first AP 108". Thereafter, the electronic device may perform comparison with AP information received from a server and identify that the electronic device 101 is currently located at the point of "2".

The electronic device 101 may determine whether the calculated current position of the electronic device 101 is located within the second distance 104. If the current position of the electronic device 101 is located between the set first distance 103 and the set second distance 104, the electronic device 101 may identify that the calculated current position of the electronic device 101 is located outside of the second distance 104 and device 101 may repeatedly determine whether the calculated current position of the electronic device 101 is located within the first distance 103.

In response to the electronic device 101 determining that the electronic device 101 is located near the geo-fence service area 102, the electronic device 101 may calculate the current position of the electronic device 101 by using the WPS which requires more battery consumption but enables more accurate location measurement than the CPS. An electronic device calculates the current position of the electronic device uniformly using the GPS. However, the electronic device 101 uses the CPS and the WPS selectively in response to the position of the electronic device 101, thereby adaptively adjusting battery consumption in the electronic device 101. Specifically, when the electronic device 101 is located outside of predetermined first distance 103, the electronic device 101 calculates the position of the electronic device 101 using the CPS and, when the electronic device is located within the second distance 104, uses the WPS which enables more accurate positioning, thereby adaptively adjusting battery consumption in the electronic device 101. When the electronic device 101 determines that the calculated current position of the electronic device 101 is located within the second distance 104, the electronic device 101 may calculate the current position of the electronic device using the GPS. When it is determined that the current position of the electronic device 101 is located within the first distance 104, the electronic device 101 may accurately determine its location within the geo-fence service area 102 using the GPS which requires more battery consumption but enables most accurate positioning compared to the CPS and WPS.

When the electronic device 101 determines that the calculated current position of the electronic device 101 is located outside of the geo-fence service area 102, the electronic device 101 may repeatedly determine whether its calculated current position is located within the second distance 104. However, when the electronic device 101 determines that the calculated current position of the electronic device 101 is located within the geo-fence service area 102, the electronic device 101 may display information indicating that the electronic device 101 is currently located within the geo-fence service area 102 on the touchscreen. As a result, the electronic device 101 adaptively and selectively uses a CPS, WPS and GPS to measure the position of the electronic device 101 depending on the current position of the electronic device 101, thereby reducing battery consumption in accurate measurement of device 101 location.

Figure 2:
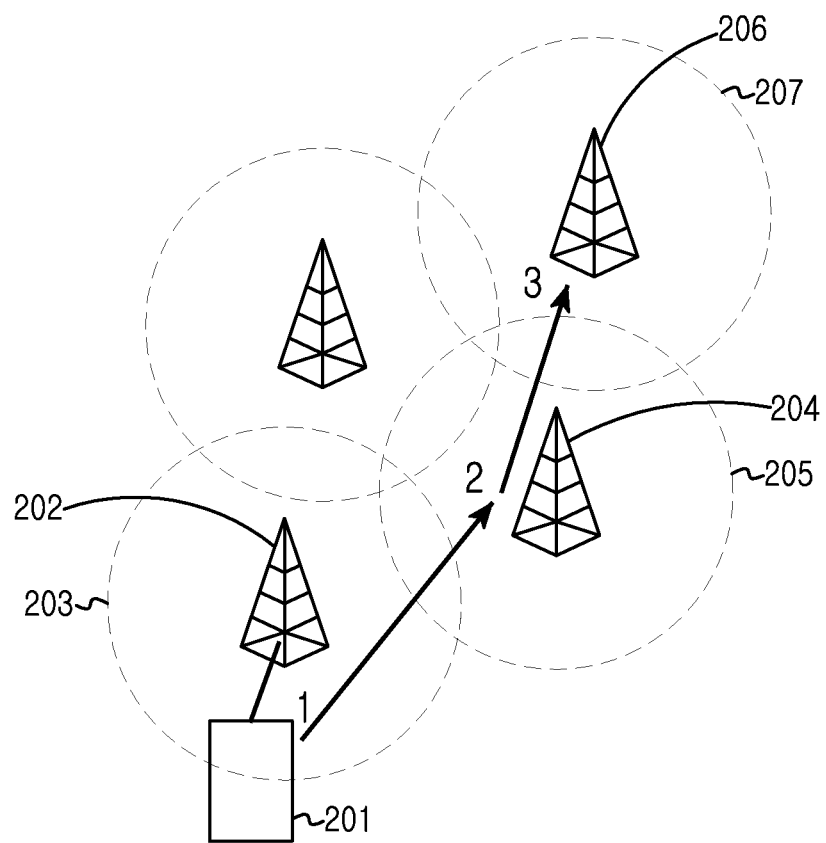
FIG. 2 illustrates calculating the position of an electronic device using a CPS according to invention principles.

FIG. 2 illustrates calculating the position of an electronic device using a CPS. Electronic device 201 receives a geo-fence service and is located at point "1" outside a currently set geo-fence service area. When the electronic device 201 receives an instruction for starting the geo-fence service, the electronic device 201 may receive information, such as cell information, position information, and the accuracy information stored in a server from the server. The electronic device 201 may calculate the current position of the electronic device 201 initially using a CPS. Specifically, the electronic device 201 may calculate the current position of the electronic device 201 by comparing the information received from the server with current serving cell information of the electronic device. For example, the electronic device 201 is currently located at the point "1" and is connected to "a first base station 202", and a cell managed by "the first base station 202" is "a first cell 203". It is identified that the electronic device 201 is connected to "the first base station 202" and "the first cell 203" managed by "the first base station 202" is a serving cell. Device 201 may perform comparison with position information according to the cell information received from the server and determine whether the electronic device 201 is currently located at the point "1".

Device 201 may calculate the changed position of the electronic device 201 exclusively using cell information. Specifically, the electronic device 201 may calculate the changed position of the electronic device 201 using cell information until it is determined that the position of the electronic device 201 is located within a predetermined first distance. That is, when the electronic device 201 determines that the position of the electronic device 201 is located outside of the predetermined first distance, the electronic device 201 may switch to an idle mode and calculate the position of the electronic device 201 exclusively in response t the information of the serving cell being changed. For example, as illustrated in FIG. 2, it is assumed that the initial position of the electronic device 201 is point "1", and the electronic device 201 moves from the point "1" to point "3" via point "2". When the electronic device 201 identifies that a current serving cell is "the first cell 203" managed by "the first base station 202", the electronic device 201 switches the mode of the electronic device 201 to the idle mode until it is identified that the serving cell is the second cell 205" managed by the second base station 204". Device 201 may switch the mode of the electronic device 201 to a wake-up mode in response to electronic device 201 identifying that the current serving cell is "the second cell 205" managed by "the second base station 204" or "a third cell 207" managed by "a third base station 206". Since the electronic device 201 calculates the current position of the electronic device 201 in response to cell information being changed, the battery consumption of device 201 is reduced.

Figure 3:
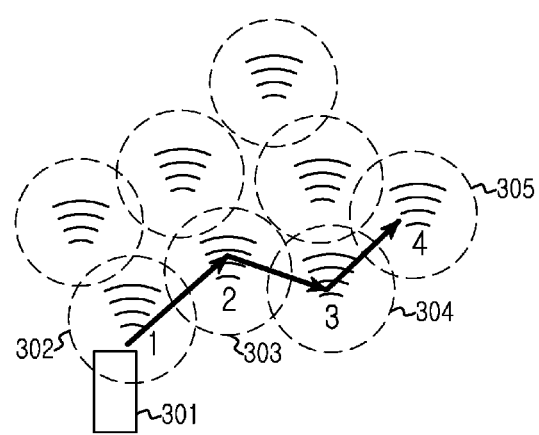
FIG. 3 is illustrates calculating the position of an electronic device using access point (AP) information according to invention principles.

FIG. 3 shows calculation of the position of an electronic device 301 using access point (AP) information. Device 301 receives a geo-fence service and the electronic device 301 moves from point "1", which is out of a currently set geo-fence service area, to point "4" via point "2" and point "3". Device 301 is currently located between a first distance and a second distance set from a central point the geo-fence service area. In addition, it is assumed that, after receiving an instruction for starting the geo-fence service, the electronic device 301 receives information, such as cell information, AP information, position information, and accuracy information from a server.

Device 301 may calculate its current position using the WPS. Specifically, the electronic device 301 scans WiFi access points (AP) periodically and acquires AP information. Thereafter, the electronic device 301 may compare the acquired AP information with AP information received from a server and calculate the current position of the electronic device 301. The electronic device 301 identifies it is connected to "the first AP 302" as a result of scanning of neighboring APs, and receiving identifying information of "the first AP 302". Device 301 may compare the information of "the first AP 302" with AP information received from the server and identify that the electronic device 301 is currently located at the point "1".

Similarly, the electronic device 301 moves from the point "1" to point "2" and the electronic device 301 identifies that the electronic device 301 is connected to "a second AP 303" as a result of scanning of neighboring APs and receiving identifying information of "the second AP 303". Device 301 may compare the information of "the second AP 303" with AP information received from the server and identify that the electronic device 301 is currently located at point "2".

Similarly, when the electronic device 301 moves from the point "2" to point "3" and the electronic device 301 identifies that the electronic device 301 is connected to "a third AP 304" as a result of scanning of neighboring APs, the electronic device 301 receives information of "the third AP 304". Thereafter, the electronic device 301 may compare the information of "the third AP 304" with AP information received from the server and identify that the electronic device 301 is currently located at point "3".

Similarly, when the electronic device 301 moves from point "3" to point "4" and the electronic device 301 identifies that the electronic device 301 is connected to "a fourth AP 305" as a result of scanning of neighboring APs, the electronic device 301 receives information of "the fourth AP 305". Thereafter, the electronic device 301 may compare the information of "the fourth AP 305" with AP information received from the server and identify that the electronic device 301 is currently located at point "4". Device 301 may calculate the current position of the electronic device 301 that is moving by using the WPS until the position of the electronic device 301 is located within the second distance. That is, when the electronic device 301 determines that the electronic device 301 is located near the geo-fence service area 301, the electronic device 301 may calculate the current position of the electronic device 301 by using the WPS which requires more battery consumption but enables more accurate location measurement than the CPS.

Figure 4A:
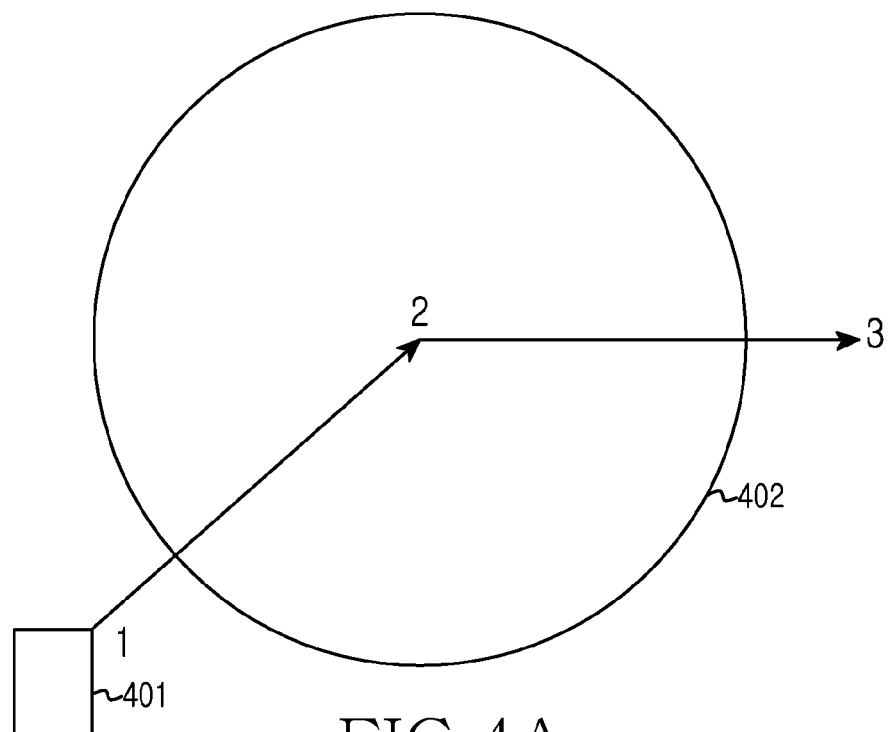
FIG. 4A, FIG. 4B and FIG. 4C show a system for determining whether an electronic device is located within a geo-fence service area using a GPS according to invention principles.
Figure 4B:
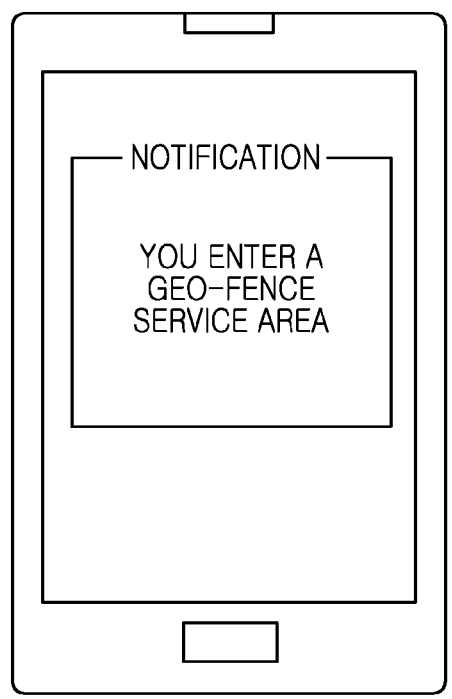
Figure 4C:
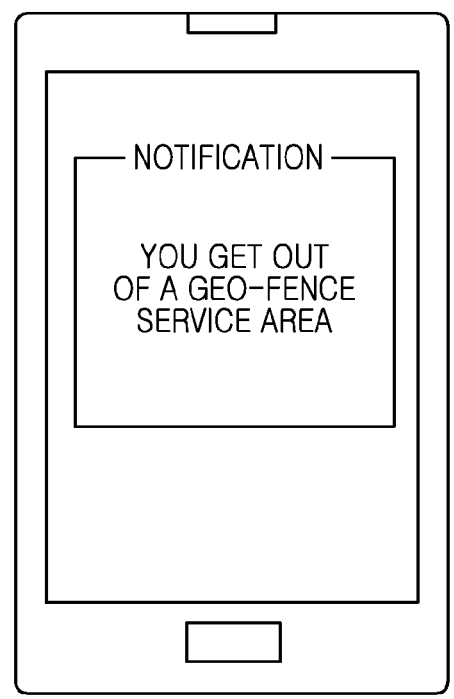

FIGS. 4A to 4C illustrate determining whether an electronic device is located within a geo-fence service area using a GPS. Device 401 receives a geo-fence service and is located within a second distance which is set outside of a geo-fence service area 402. In addition, it is assumed that the electronic device 401 moves from the point "1" to the point "3" via the point "2".

Device 401 is currently located outside of the geo-fence service area 402 and within the set second distance, the electronic device 401 may calculate the position of the electronic device using the GPS. Specifically, when it is determined that the position of the electronic device 401 is located outside of the set first distance, the electronic device 401 may determine whether the position of the electronic device 401 is located between the set first distance and the set second distance using the CPS that involves lowest battery consumption.

In response to the electronic device 401 determining that the position of the electronic device 401 is located between the first distance and the second distance, the electronic device 401 may calculate the current position of the electronic device 401 by using the WPS which requires more battery consumption but enables more accurate positioning than the CPS. In response to the electronic device 401 determining that its position is located within the second distance, the electronic device 401 may calculate the current position of the electronic device 401 by using a GPS which requires more battery consumption but enables more accurate positioning than the CPS or the WPS. Since the position of the electronic device 401 is located outside of the geo-fence service area 402 and within the set second distance, the electronic device 401 may determine whether the electronic device 401 enters the geo-fence service area 402 by using the GPS that enables the most accurate measurement of the current position of the electronic device 401. In response to device 401 determining that it moves from point "1" outside of the geo-fence service area 402 to point "2" within the geo-fence service area 402 as a result of calculation of the current position of the electronic device 401 using the GPS, the electronic device 401 may display information indicating it is located within the geo-fence service area 402 on its touchscreen.

For example, as illustrated in FIG. 4B, the electronic device 401 may display a notification message, "you enter a geo-fence service area", on its touchscreen and may play back the notification message through a speaker. Device 401 determines that the electronic device 401 moves from the point "2" within the geo-fence service area 402 to point "3" outside of the geo-fence service area 402 as a result of calculation of the current position of the electronic device 401 using the GPS, Device 401 may display information indicating that the electronic device 401 is located outside of the geo-fence service area 402 on its touchscreen. For example, as illustrated in FIG. 4C, the electronic device 401 may display a notification message "you have left a geo-fence service area", on the touchscreen of the electronic device 401. In addition, the electronic device 401 may play back the notification message through a speaker provided in the electronic device 401.

Figure 5:
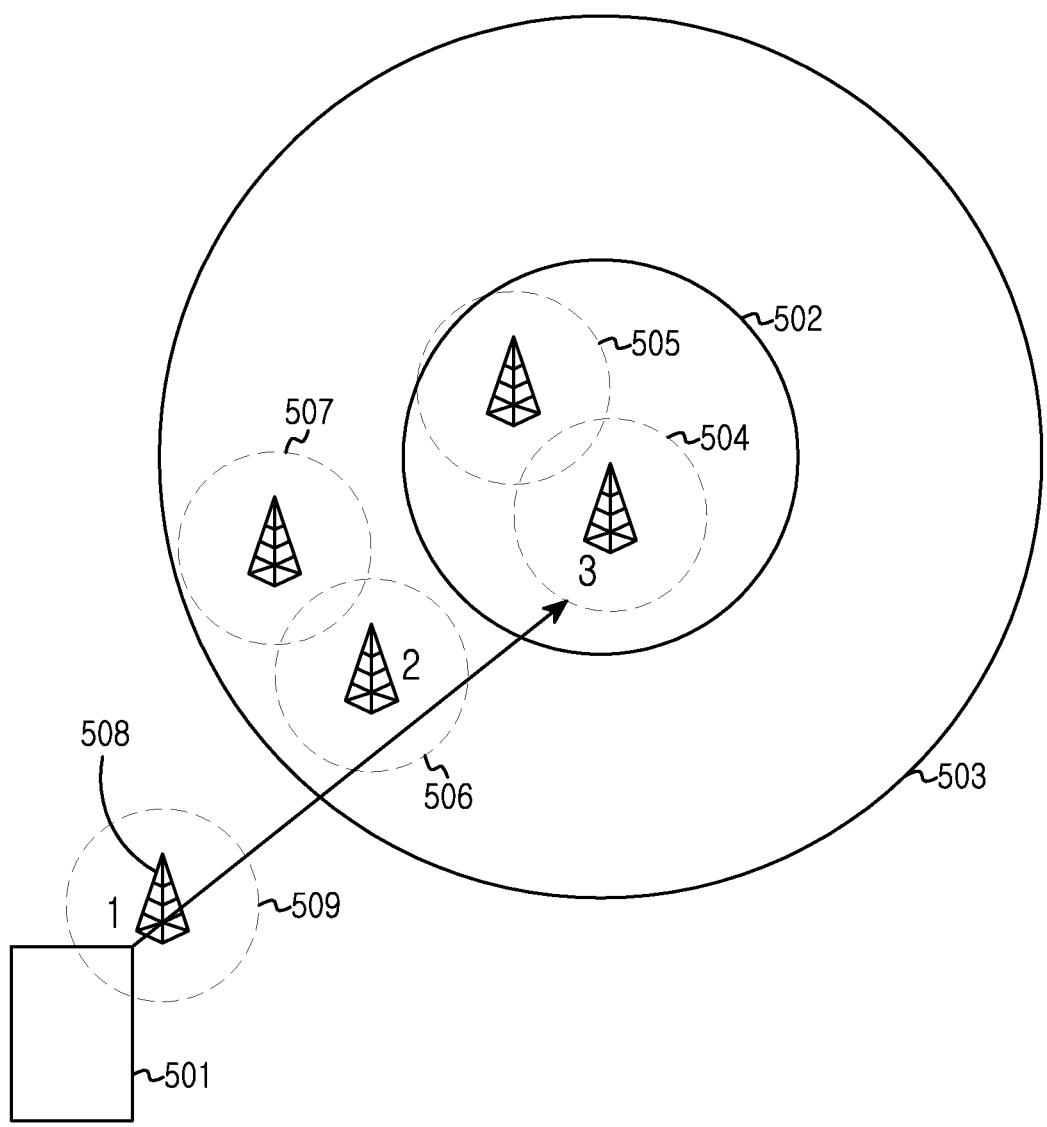
FIG. 5 illustrates an electronic device system for receiving a geo-fence service with low power consumption according to invention principles.

FIG. 5 shows an electronic device system for receiving a geo-fence service with low power consumption. Device 501 receives a geo-fence service and moves from point "1" which is out of a currently set geo-fence service area 502 to point "3" via point "2". A predetermined range 503 is set which is wider than the geo-fence service area by a predetermined size. In response to device 501 receiving an instruction for starting the geo-fence service, the electronic device 501 may receive, from a server, information concerning cells 504 and 505 of one or more base stations located within the geo-fence service area 502 and information concerning cells 506 and 507 of one or more base stations located within the predetermined range 503 which is outside of the geo-fence service area 502. Device 501 may receive information concerning a serving cell managed by a base station currently connected to the electronic device 501 from the server. Device 501 determines it is connected to "a first base station 508" and "a first cell 509" managed by "the first base station 508" is the serving cell. Device 501 may perform comparison with position information according to the cell information received from the server and identify that the electronic device 501 is currently located at the point "1".

That is, the electronic device 501 may identify that information (also referred to as serving cell information) about the serving cell 509 is not identical to information of any one of the cells 504 and 505 of one or more base stations located within the predetermined range 503 which is outside of the geo-fence service area 502. Device 501 may switch to an idle mode and determine whether the serving cell information is changed. When the position of the electronic device 501 is changed to lie outside of the predetermined range 503, the electronic device may switch the mode of the electronic device 501 to an idle mode. Device 501 may determine whether the serving cell information is changed and switch from idle mode to a wake-up mode and continuously receive the serving cell information from the server. However, when the electronic device 501 has determined that the serving cell information is unchanged, device 501 may repeatedly determine whether the serving cell information is changed.

The position of the electronic device 501 moves from point "1" to point "2" and device 501 determines that the information of the serving cell 506 is identical to the information of the cell 506 of a base station located within the predetermined range 503 which is outside of the geo-fence service area 502. However, the electronic device 501 may identify that the serving cell information is not identical to information of the cells 504 and 505 of one or more base stations located within the geo-fence service area 502. That is, the electronic device 501 may identify that the current position of the electronic device 501 is located within the predetermined range 503 and outside of the geo-fence service area 502. Device 501 may calculate the current position of the electronic device 501 using the GPS until it is identified that the position of the electronic device 501 is moved within the geo-fence service area 502. In this embodiment, the electronic device 501 may calculate its position using the GPS when the position of the electronic device 501 is located between the predetermined range 503 and the boundary of the geo-fence service area 502. Therefore, since the position calculation using the GPS is limited to being performed where the position of the electronic device 501 is located near the geo-fence service area 502, battery consumption is reduced.

Figure 6:
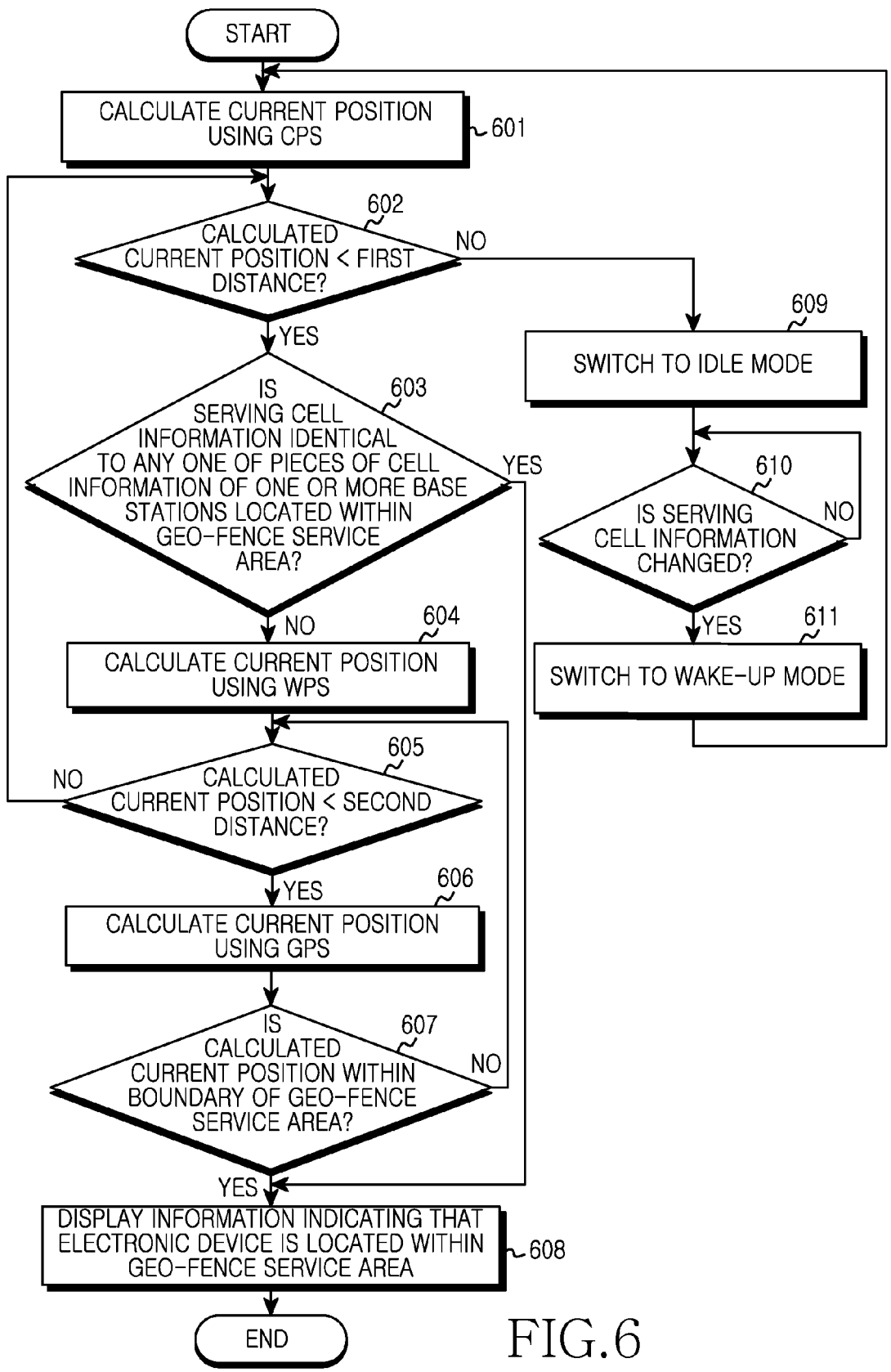
FIG. 6 is a flowchart of a method of operation of an electronic device according to invention principles.

FIG. 6 is a flowchart of a method of operation of an electronic device In step 601, an electronic device may calculate the current position of the electronic device using a CPS by comparing information received from a server with information of a current serving cell of the electronic device. For example, it is assumed that the electronic device is currently located at a point "1" and is connected to "a first base station", and a cell managed by "the first base station" is "a first cell". It is identified that the electronic device is currently connected to "the first base station" and "the first cell" managed by "the first base station" is the serving cell. The device may perform comparison with position information according to cell information received from the server and identify that the electronic device is currently located at the point "1". In step 602, the electronic device may determine whether the calculated current position of the electronic device is located within a first distance comprising a straight distance from the central point of a geo-fence service area by a predetermined distance. The device may determine whether the calculated current position of the electronic device is located within or outside of the first distance.

When it is determined that the calculated position of the electronic device is located within the first distance in the above determination of step 602, the electronic device may determine whether serving cell information matches cell information of one or more base stations located within the geo-fence service area in step 603 and the device is located within the geo-fence service area. The electronic device displays information indicating it is located within the geo-fence service area on the touchscreen and ends the process. When the electronic device determines that the serving cell information does not match cell information of one or more base stations located within the geo-fence service area in step 603, the electronic device may calculate the current position of the electronic device using a WPS in step 604. Specifically, the electronic device scans WiFi access points (AP) periodically and acquires AP information. Thereafter, the electronic device may compare the acquired AP information with AP information received from the server and calculate the current position of the electronic device. For example, the electronic device moves from point "1" to point "2" and the current location of the electronic device is located within the first distance, and the electronic device is currently connected to "a first AP". The device identifies that the electronic device is connected to "the first AP" as a result of scanning of neighboring APs and receives information of "the first AP". Thereafter, the electronic device may perform comparison with AP information received from a server and identify that the electronic device is currently located at the point "2". In step 605, the electronic device may determine whether the current position of the electronic device calculated using the WPS is located within a second distance. The second distance comprises a straight distance from the central point of a geo-fence service area by a predetermined distance, and the second distance may be shorter than the first distance. That is, the electronic device may determine whether the calculated current position of the electronic device is located within or outside of the second distance. When the electronic device determines that the current position of the electronic device is located within the second distance in step 605, the electronic device may calculate the current position of the electronic device using a GPS.

In step 607, the electronic device may determine whether the current position of the electronic device calculated using the GPS is located within the boundary of the geo-fence service area. GPS requires more battery consumption compared to the CPS and WPS but enables most accurate positioning. When the electronic device determines that the current position of the electronic device calculated using the CPS is located outside of the first distance in the determination step 602, the electronic device may switch the mode of the electronic device to an idle mode in step 609 to reduce battery consumption. In step 610, the electronic device may determine whether the serving cell information is changed and switch to a wake-up mode and repeat the process of FIG. 6 from step 601. However, when the electronic device determines that the serving cell information is not changed in step 610, the electronic device may iteratively repeat step 610. When the electronic device determines that the serving cell information is matches cell information of one or more base stations located within the geo-fence service area in step 603, the electronic device may display information indicating that the position of the electronic device is located within the geo-fence service area.

When the electronic device determines that the current position of the electronic device calculated using the WPS is located outside of the second distance in step 605, the electronic device may repeatedly perform step 602. When the electronic device determines that the current position of the electronic device calculated using the GPS is located outside of the geo-fence service area in step 607, the electronic device iteratively performs step 605.

Figure 7:
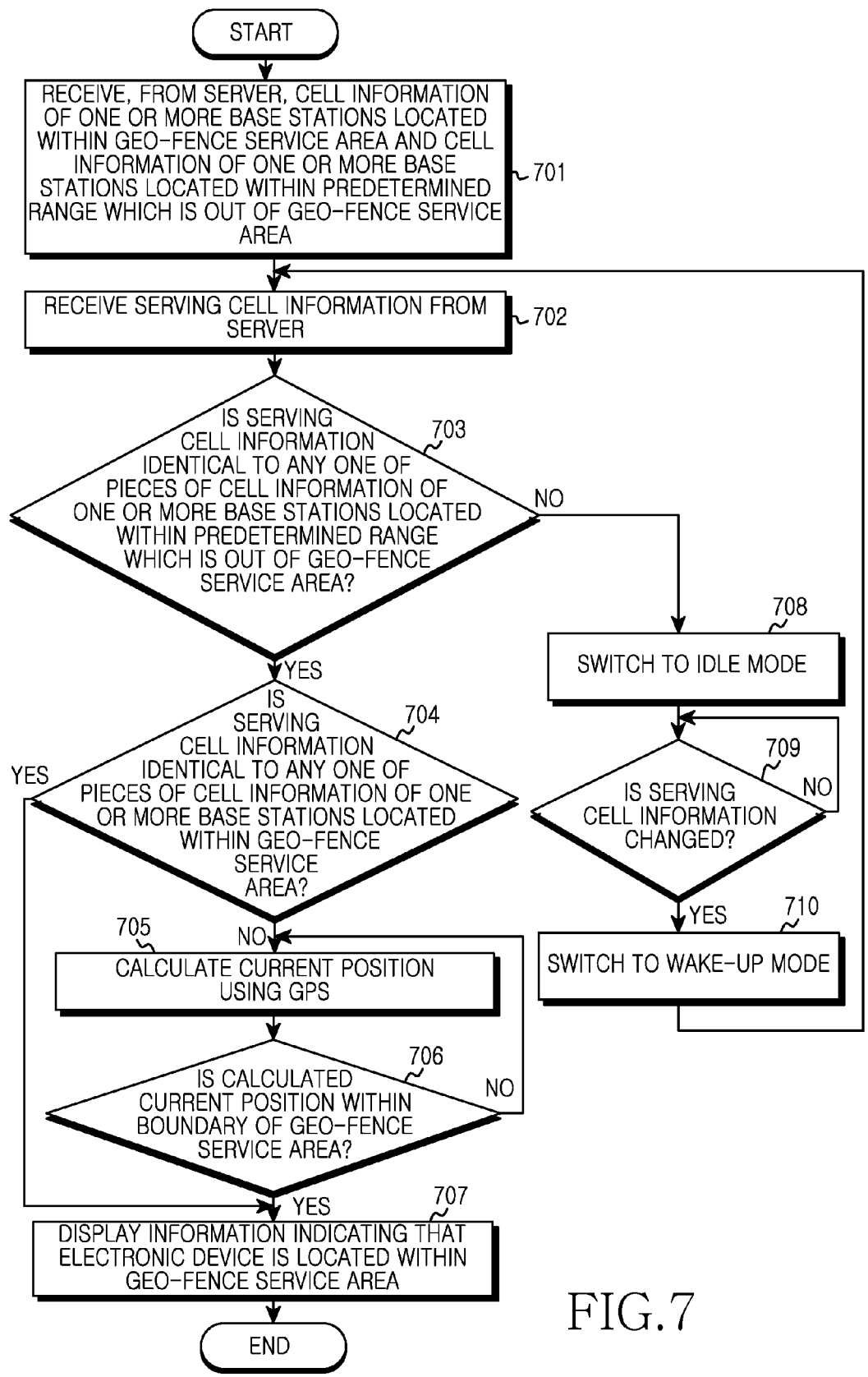
FIG. 7 is a flowchart of a method of operation of an electronic device according to invention principles.

FIG. 7 shows a flowchart of a method of operation of an electronic device where in step 701, the electronic device may receive, from a server, information of the cells of one or more base stations located within a geo-fence service area and information of the cells of one or more base stations located within a predetermined range which is outside of the geo-fence service area. Specifically, when the electronic device receives an instruction for initiating a geo-fence service, the electronic device may receive, from the server, information of the cells of one or more base stations located within the geo-fence service area and information of the cells of one or more base stations located within the predetermined range which is outside of the geo-fence service area. In step 702, the electronic device may receive serving cell information from the server. Specifically, the electronic device may receive, from the server, the information of a serving cell managed by a base station currently connected to the electronic device.

In step 703, the electronic device may determine whether the serving cell information matches cell information of one or more base stations located within the predetermined range which is outside of the geo-fence service area by using the cell information. If there is a match, the electronic device may determine whether the serving cell information matches an item of cell information of one or more base stations located within the geo-fence service area in step 704. That is, when the electronic device is located within the geo-fence service area, the electronic device displays information indicating that the electronic device is located within the geo-fence service area on the touchscreen and the process ends. When the electronic device determines that the serving cell information does not match an item of cell information of one or more base stations located within the geo-fence service area in step 704, the electronic device may calculate the current position of the electronic device using a GPS in step 705. That is, when the electronic device determines that the current position of the electronic device is located outside of the geo-fence service area and within the predetermined range which is outside of the geo-fence service area, the electronic device may calculate the current position of the electronic device using the GPS.

In step 706, the electronic device may determine whether the current position of the electronic device calculated using the GPS is located within the boundary of the geo-fence service area. That is, the electronic device may calculate the current position of the electronic device using the GPS until it is identified that the position of the electronic device is moved within the geo-fence service area. In this embodiment, where the position of the electronic device is located between the predetermined range and the boundary of the geo-fence service area, the electronic device calculates the position of the electronic device using the GPS. When the electronic device determines that the calculated current position of the electronic device is located within the boundary of the geo-fence service area in the determination step 706, the electronic device may display information indicating that the electronic device is located within the geo-fence service area in step 707.

However, when the electronic device determines that the serving cell information does not match an item of cell information of one or more base stations located within the predetermined range outside of the geo-fence service area in the above determination step 703, the electronic device may switch the mode of the electronic device to an idle mode in step 708 to reduce battery consumption. In step 709, the electronic device may determine whether the serving cell information is changed and in step 710 switch to a wake-up mode and iteratively perform the process from step 702. However, when the electronic device determines that the serving cell information is not changed in the determination step 709, the electronic device may repeatedly perform the step 709 of determining whether the serving cell information is changed. When the electronic device determines that the serving cell information an item of cell information of one or more base stations located within the geo-fence service area in the above determination step 704, the electronic device may repeatedly perform the step 707. In addition, when the electronic device determines that the calculated current position of the electronic device is not located within the boundary of the geo-fence service area in the determination step 706, the process returns to step 705.

Figure 8A:
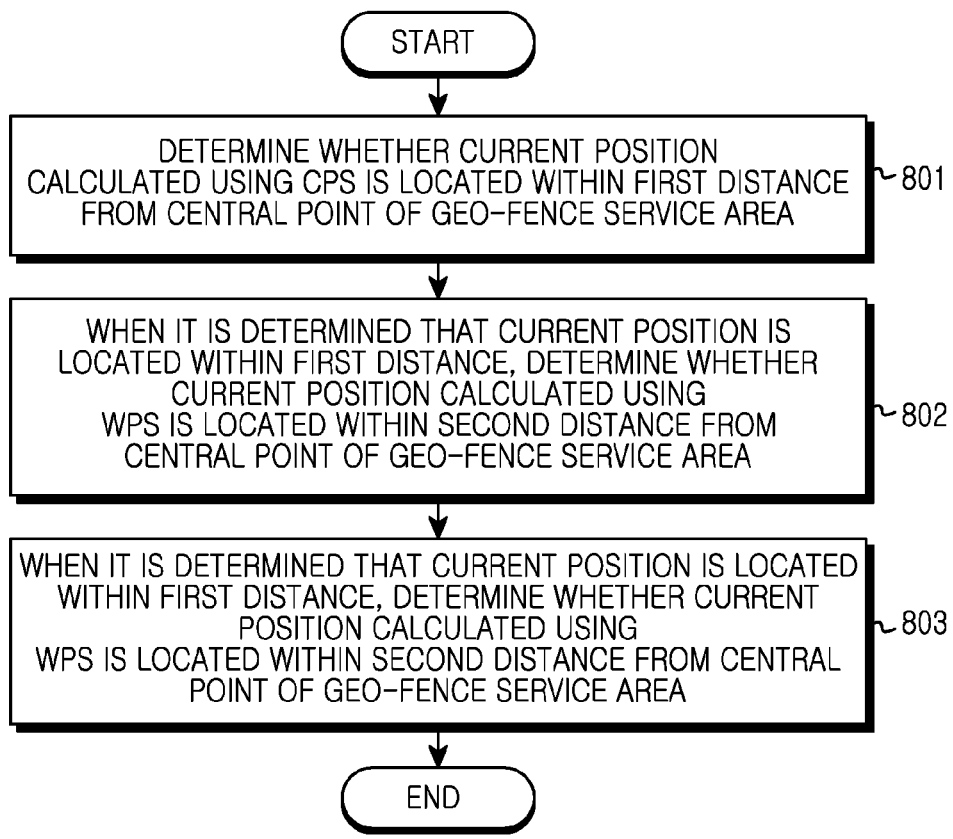
FIG. 8A is a flowchart of a method for operating an electronic device for receiving a geo-fence service with low power consumption according to invention principles.

FIG. 8A is a flowchart of a method for operating an electronic device for receiving a geo-fence service with low power consumption. In step 801, an electronic device may determine whether a current position calculated using a CPS is located within a first distance from the central point of a geo-fence service area. Specifically, the electronic device may calculate the current position of the electronic device by comparing information received from a server with information of a current serving cell of the electronic device. Thereafter, the electronic device may determine whether the calculated current position is located within the first distance. Herein the first distance may be defined as a straight distance from the central point of the geo-fence service area by a predetermined distance. In step 802, when the electronic device determines that the current position is located within the first distance, the electronic device may determine whether a current position calculated using a WPS is located within a second distance from the central point of the geo-fence service area. Specifically, the electronic device scans WiFi access points (AP) periodically and acquires AP information. The electronic device may compare the acquired AP information with AP information received from the server and calculate the current position of the electronic device. For example, the device moves from point "1" to point "2", and the current location of the device is located within the first distance, and the electronic device is currently connected to "a first AP". The electronic device identifies that the electronic device is connected to "the first AP" as a result of scanning of neighboring APs and receives information of "the first AP".

The electronic device may perform comparison with AP information received from a server and identify that the electronic device is currently located at point "2". Herein, the second distance may be defined as a straight distance from the central point of a geo-fence service area by a predetermined distance, and the second distance may be shorter than the first distance. The electronic device determines that a current position calculated using a WPS is located within the first distance, the electronic device may determine whether a current position calculated using a GPS is located within the boundary of the geo-fence service area in step 803. Specifically, when it is determined that the current position of the electronic device is located within the first distance, the electronic device may accurately determine whether the electronic device is located within the geo-fence service area using the GPS which requires more battery consumption compared to the CPS and WPS but enables most accurate positioning.

Figure 8B:
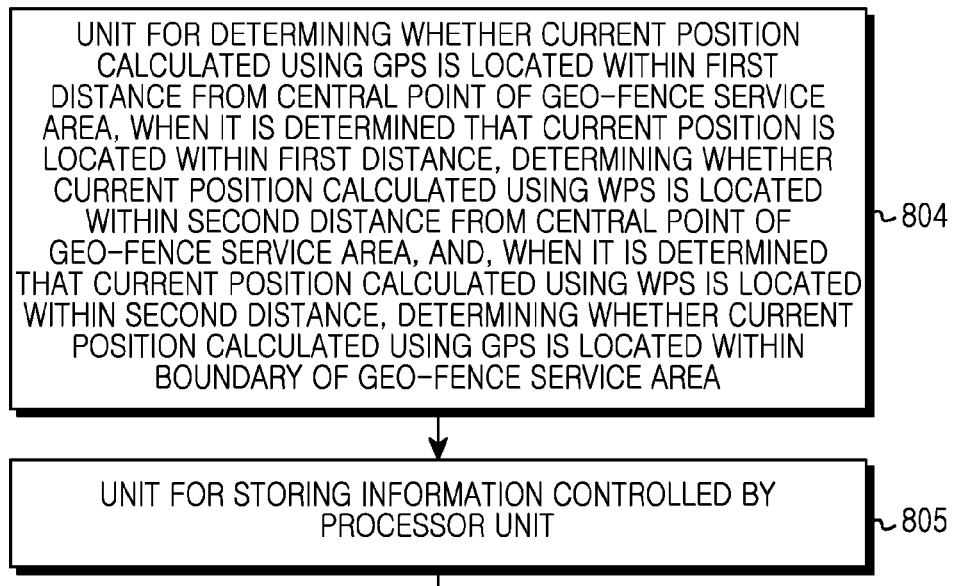
FIG. 8B is a flowchart of a method of configuration of an electronic device for receiving a geo-fence service with low power consumption according to invention principles.

FIG. 8B is a diagram illustrating a configuration of an electronic device for receiving a geo-fence service with low power consumption. A processor unit 804 of the electronic device may determine whether a current position calculated using a CPS is located within a first distance from the central point of a geo-fence service area. When it is determined that the current position is located within the first distance, the processor unit determines whether a current position calculated using a WPS is located within a second distance from the central point of the geo-fence service area. When it is determined that the current position calculated using the WPS is located within the second distance, the processor unit may determine whether a current position calculated using a GPS is located within the boundary of the geo-fence service area. Specifically, the processor unit of the electronic device may calculate the current position of the electronic device by comparing information received from a server with information of a current serving cell of the electronic device. The electronic device further determines whether the calculated current position is located within the first distance and if so, determines whether the current position calculated using the WPS is located within the second distance from the central point of the geo-fence service area. Specifically, the processor unit scans WiFi access points (APs) periodically and acquires AP information. Thereafter, the processor unit may compare the acquired AP information with AP information received from the server and calculate the current position of the electronic device. Thereafter, when the processor unit determines that the current position calculated using the WPS is located within the second distance, the processor unit may determine whether the current position calculated using the GPS is located within the boundary of the geo-fence service area. Specifically, when the processor unit determines that the current position of the electronic device is located within the first distance, the processor unit may accurately determine whether the electronic device is located within the geo-fence service area using the GPS.

Thereafter, the memory 805 of the electronic device may store information controlled by the processor unit. The memory stores software. Components of the software may include an operation system (OS) module, a communication module, a graphic module, a user interface (UI) module, a codec module, a camera module, and one or more application modules.

Figure 9A:
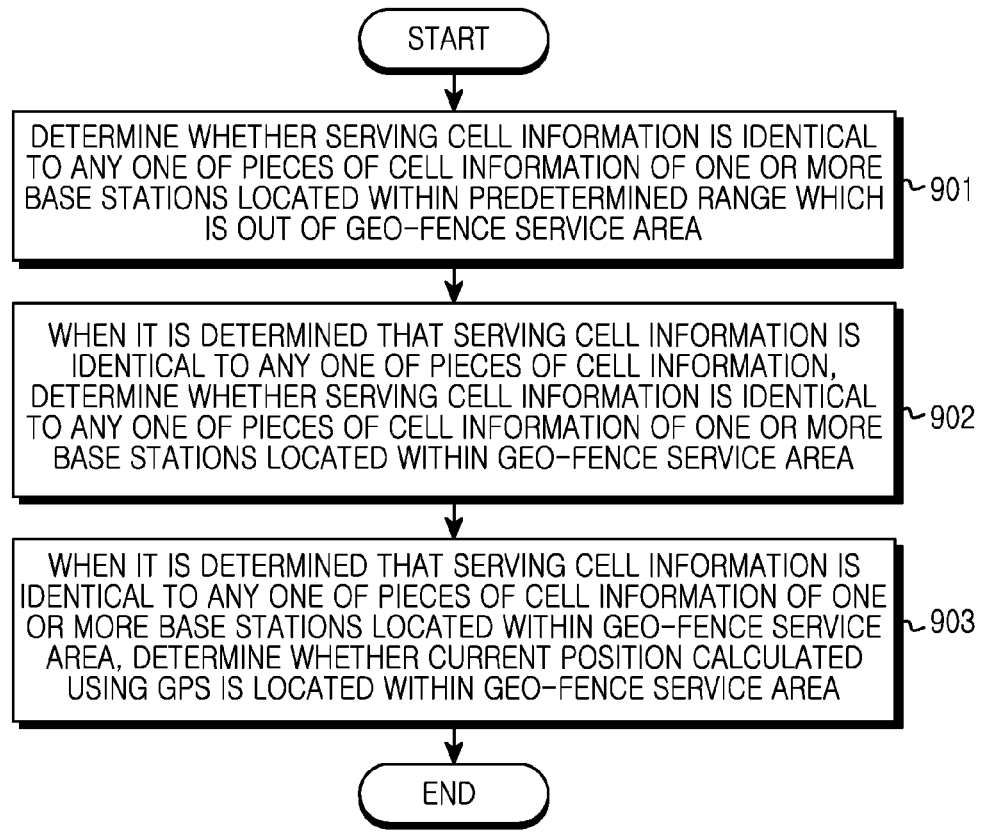
FIG. 9A is a flowchart of a method for operating an electronic device for receiving a geo-fence service with low power consumption according to invention principles.

FIG. 9A is a flowchart of a method for operating an electronic device for receiving a geo-fence service with low power consumption. In step 901, the electronic device may determine whether serving cell information matches an item of cell information of one or more base stations located within a predetermined range which is out of a geo-fence service area. The electronic device may determine whether the serving cell information is identical to an item of cell information of one or more base stations located within the geo-fence service area in step 902. That is, the electronic device may determine whether the current position of the electronic device is located within the predetermined range which is outside of the geo-fence service area by using the cell information.

If the electronic device determines that the serving cell information does not match an item of cell information of one or more base stations located within the geo-fence service area, the electronic device may determine whether the current position is located within the geo-fence service area using a GPS in step 903. That is, when the electronic device determines that the current position of the electronic device is located outside of the geo-fence service area but within the predetermined range which is outside of the geo-fence service area, the electronic device may calculate the current position of the electronic device.

Figure 9B:
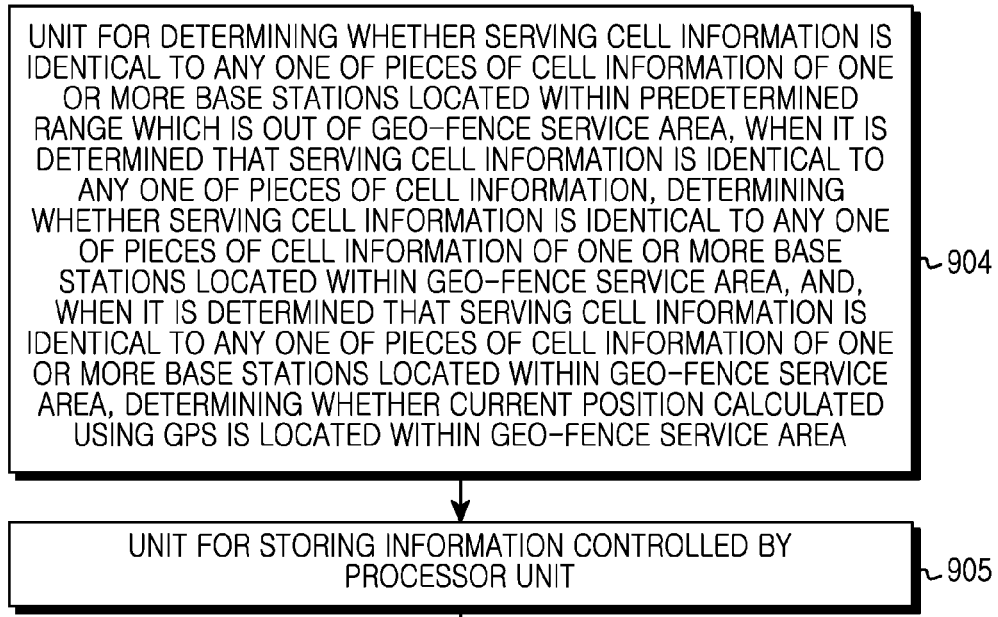
FIG. 9B is a flowchart of a method of configuration of an electronic device for receiving a geo-fence service with low power consumption according to invention principles.

FIG. 9B shows a configuration of an electronic device for receiving a geo-fence service with low power consumption. Processor unit 904 of the electronic device may determine whether serving cell information matches an item of cell information of one or more base stations located within a predetermined range which is out of a geo-fence service area, and if so, determines whether the serving cell information matches an item of cell information of one or more base stations located within the geo-fence service area. If the serving cell information matches an item of cell information of one or more base stations located within the geo-fence service area, the processor unit may determine whether the current position is located within the geo-fence service area by using a GPS. Memory 905 of the electronic device may store information controlled by the processor unit. Herein, the memory stores software including an operation system (OS) module, a communication module, a graphic module, a user interface (UI) module, a codec module, a camera module, and one or more application modules.

Figure 10:
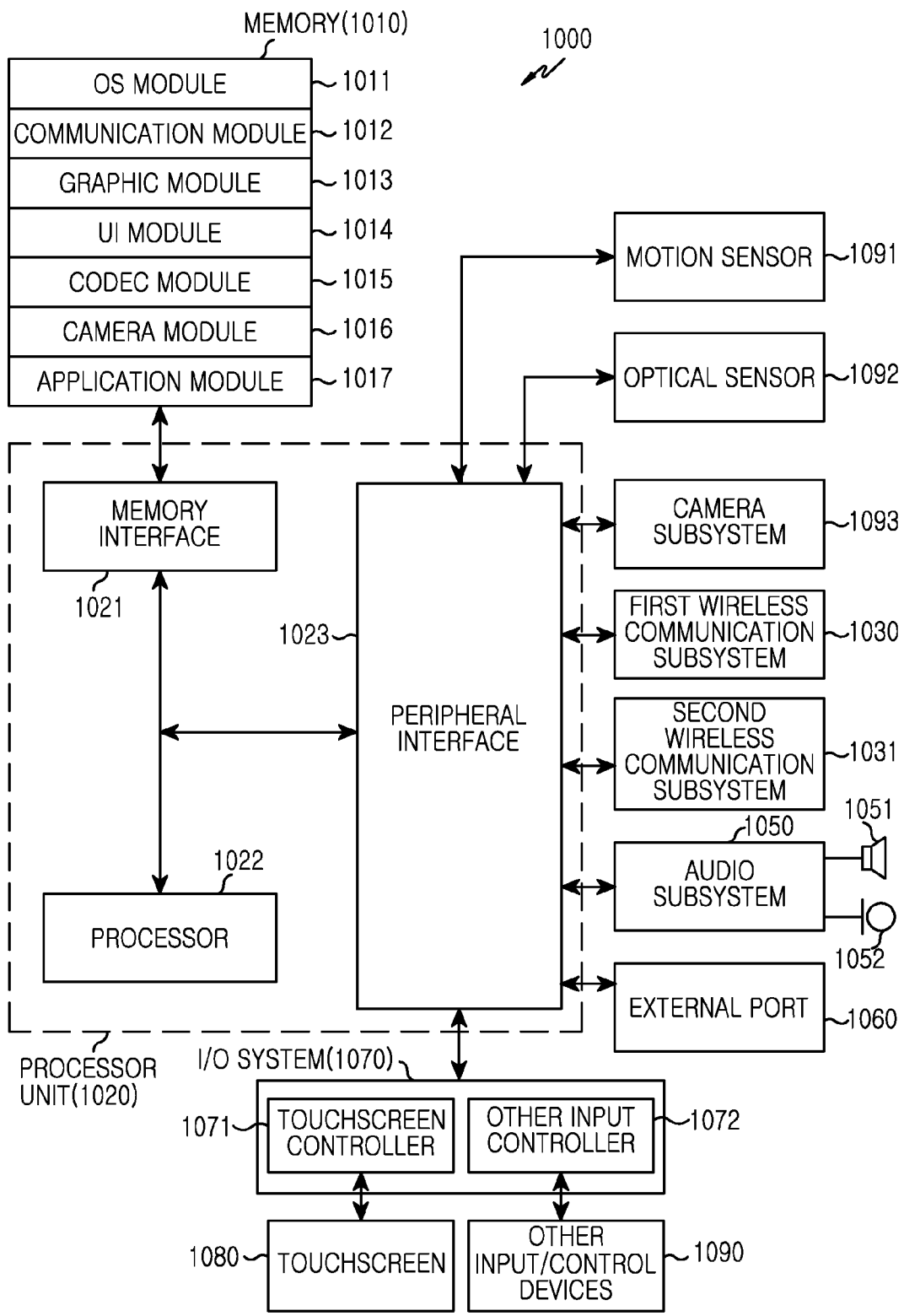
FIG. 10 shows an electronic device system according to invention principles.

FIG. 10 shows an electronic device 1000 comprising a portable electronic device, such as a portable terminal, a mobile phone, a mobile pad, a media player, a tablet computer, a handheld computer, or a Personal Digital Assistant (PDA), for example. In addition, the electronic device may include two or more functions of these devices. The electronic device 1000 includes a memory 1010, a processor unit 1020, a first wireless communication subsystem 1030, a second wireless communication subsystem 1031, an external port 1060, an audio subsystem 1050, a speaker 1051, a microphone 1052, an input/output (I/O) system 1070, a touchscreen 1080, and other input/control devices 1090. The memory unit 1010 and the external port 1060 may comprise multiple devices.

The processor unit 1020 (processor) may include a memory interface 1021, at least one processor 1022, and a peripheral interface 1023. The processor unit 1020 may determine whether a current position calculated using a CPS is located within a first distance from the central point a geo-fence service area. When determining that the current position is located within the first distance, the processor unit determines whether a current position calculated using a WPS is located within a second distance from the central point the geo-fence service area. When determining that the current position calculated using the WPS is located within the second distance, the processor unit may determine whether a current position calculated using a GPS is located within the boundary of the geo-fence service area. In addition, the processor unit 1020 may determine whether serving cell information matches an item of cell information of one or more base stations located within the geo-fence service area. In addition, the processor unit 1020 may determine whether the serving cell information matches an item of cell information of one or more base stations located within the geo-fence service area. In response to determining that the current position is located outside of the first distance, the processor unit 1020 switches to an idle mode and determines whether the serving cell information is changed. The processor unit 2010 may switch to a wake-up mode from the idle mode and repeatedly perform determination of whether the current position calculated using the CPS is located within the first distance from the central point of the geo-fence service area. Thereafter, when the processor unit 1020 determines that the current position calculated using the WPS is located outside of the second distance, the processor unit may repeatedly perform determination of whether the current position calculated using the CPS is located within the first distance from the central point of the geo-fence service area. In addition, when determining that the current position calculated using the GPS is located outside of the boundary of the geo-fence service area, the processor unit 1020 may repeatedly determine whether the current position calculated using the WPS is located within the second distance from the central point of the geo-fence service area. In addition, the processor unit 1020 may determine whether the serving cell information matches an item of cell information of one or more base stations located within a predetermined range which is outside and inside of the geo-fence service area. In response to determining that the serving cell information does not match an item of cell information of one or more base stations located within the geo-fence service area, the processor unit may determine whether the current position is located within the geo-fence service area by using the GPS. In addition, the processor unit 1020 may switch to the idle mode and determine whether the serving cell information is changed.

In response to determining that the serving cell information is changed, the processor unit 1020 switches to the wake-up mode from the idle mode and may repeatedly perform determination of whether the serving cell matches an item of cell information of one or more base stations located within the predetermined range which is outside of the geo-fence service area. In addition, when determining that the current position is not located within the geo-fence service area, the processor unit 1020 may repeatedly perform determination of whether the current position is located within the geo-fence service area by using the GPS. The processor 1022 executes different software programs to perform different functions for the electronic device 1000, including voice communication and data communication. In addition to these functions, the processor 1022 executes a software module (instruction set) stored in the memory 1010 and performs different functions corresponding to the software module.

The processor 1022 may include at least one data processor, image processor, or codec. The data processor, the image processor, or the codec may be configured separately. Also, the processor 1022 may be configured by a plurality of processors performing different functions. The peripheral interface 1023 connects the different peripheral devices and I/O subsystem 1070 of the electronic device 1000 to the processor 1022 and the memory 1010 (through the memory interface). The different components of the electronic device 1000 may be coupled by at least one communication bus (not illustrated) or stream line (not illustrated). The external port 1060 is used to connect a portable electronic device (not illustrated) to other electronic devices directly or indirectly through a network (for example, Internet, Intranet, or wireless LAN). The external port 1060 may be, for example, a universal serial bus (USB) port or a FireWire port.

A motion sensor 1091 and an optical sensor 1092 may be connected to the peripheral interface 1023 to enable different functions. For example, the motion sensor 1091 and the optical sensor 1092 may be connected to the peripheral interface 1023 to detect a motion of the electronic device and detect light. In addition, other sensors such as a positioning system, a temperature sensor, and a biosensor may be connected to the peripheral interface 1023 to perform relevant functions. A camera subsystem 1093 may perform camera functions such as image and video clip recording. The optical sensor 1092 may use a CCD (charged coupled device) or a CMOS (complementary metal-oxide semiconductor) device. A communication function is performed through one or more wireless communication subsystems 1030 and 1031. The wireless communication subsystems 1030 and 1031 may include a radio frequency (RF) receiver and transceiver and/or an optical (e g, infrared) receiver and transceiver. The communication networks may include, but are not limited to, a GSM (Global System for Mobile Communication) network, an EDGE (Enhanced Data GSM Environment) network, a CDMA (Code Division Multiple Access) network, a W-CDMA (W-Code Division Multiple Access) network, an LTE (Long Term Evolution) network, an OFDMA (Orthogonal Frequency Division Multiple Access) network, a WiFi (Wireless Fidelity) network, a WiMax network, and/or a Bluetooth network. The first wireless communication subsystem 1030 and the second wireless communication subsystem 1031 may be integrated with each other as one wireless communication subsystem.

The audio subsystem 1050 is connected to the speaker 1051 and the microphone 1052 to perform audio stream input/output functions such as voice recognition, voice replication, digital recording, and phone functions. That is, the audio subsystem 1050 communicates with the user through the speaker 1051 and the microphone 1052. The audio subsystem 1050 receives a data stream through the peripheral interface 1023 of the processor unit 1020 and converts the received data stream into a data stream. The data stream is transmitted to the speaker 1051. The speaker 1051 converts the data stream into sound waves audible by humans and outputs the same. The microphone 1052 converts sound waves received from humans or other sound sources into a data stream. The audio subsystem 1050 receives the data stream converted from the microphone 1052. The audio subsystem 1050 converts the received data stream into an audio data stream and transmits the audio data stream to the peripheral interface 1023. The audio subsystem 1050 may include an attachable/detachable earphone, a headphone, or a headset.

The I/O (Input/Output) subsystem 1070 may include a touchscreen controller 1071 and/or an other input controller 1072. The touchscreen controller 1071 may be connected to the touchscreen 1080. The touchscreen 1080 and the touchscreen controller 1071 may detect a touch or a motion by using a multi-touch detector including, but not limited to, a proximity sensor array or other components, as well as capacitive, resistive, infrared and surface acoustic wave systems for determining one or more touch points on the touchscreen 1080. The other input controller 1072 may be connected to the other input/control devices 1090. The other input/control device 1090 may include one or more buttons, a rocker switch, a thumb wheel, a dial, a stick, and/or a pointer device such as a stylus.

The touchscreen 1080 provides an I/O interface between the electronic device 1000 and the user. That is, the touchscreen 1080 transmits data representing a user touch input to the electronic device 1000. Also, the touchscreen 1080 is a medium that displays an output from the electronic device 1000 to the user. That is, the touchscreen 1080 displays a visual output to the user. The visual output may be represented by a text, graphics, a video, or a combination thereof. The touchscreen 1080 may use different display technologies. For example, the touchscreen 1080 may use, an LCD (liquid crystal display), an LED (Light Emitting Diode), an LPD (light emitting polymer display), an OLED (Organic Light Emitting Diode), an AMOLED (Active Matrix Organic Light Emitting Diode), or an FLED (Flexible LED). When it is determined that the serving cell information matches an item of cell information of one or more base stations located within the geo-fence service area, the touchscreen 1080 may display information indicating that the electronic device is located within the geo-fence service area. In addition, when it is determined that a current position calculated using the GPS is located within the boundary of the geo-fence service area, the touchscreen 1080 may display information indicating that the electronic device is located within the geo-fence service area. In addition, when it is determined that the serving cell information matches an item of cell information of one or more base stations located within the geo-fence service area, the touchscreen 1080 may display information indicating that the electronic device is located within the geo-fence service area. In addition, when it is determined that the current position is located within the geo-fence service area, the touchscreen 1080 may display information indicating that the electronic device is located within the geo-fence service area. In addition, when it is determined that the serving cell information matches an item of cell information of one or more base stations located within the geo-fence service area, the touchscreen 1080 may display information indicating that the electronic device is located within the geo-fence service area. In addition, when it is determined that the current position is located within the geo-fence service area, the touchscreen 1080 may display information indicating that the electronic device is located within the geo-fence service area.

The memory 1010 may be connected to the memory interface 1021. The memory unit 1010 may include one or more high-speed random-access memories (RAMs) such as magnetic disk storage devices, one more nonvolatile memories, one or more optical storage devices, and/or one or more flash memories (for example, NAND flash memories or NOR flash memories). The memory 1010 stores software. Components of the software include an operation system (OS) module 1011, a communication module 1012, a graphic module 1013, a user interface (UI) module 1014, a codec module 1015, a camera module 1016, and one or more application modules 1017. Also, since the module that is an element of the software may be represented as a set of instructions, the module may be referred to as an instruction set. The module may also be referred to as a program. The OS module 1011 (for example, WINDOWS, LINUX, Darwin, RTXC, UNIX, OS X, or an embedded OS such as VxWorks) includes different software elements for controlling general system operations. For example, general system operation controls may include memory control/management, storage hardware (device) control/management, and power control/management. The OS module also performs a function for enabling smooth communication between different hardware elements (devices) and software elements (modules).

The communication module 1012 may enable communication with other electronic devices, such as computers, servers, and/or portable terminals, through the wireless communication subsystems 1030 and 1031 or the external port 1060. The communication module 1012 may receive the cell information of at least one base station located within a geo-fence service area and the cell information of at least one base station located within a predetermined range outside of the geo-fence service area, from a server. In addition, the communication module 1012 may receive the information of a serving cell from the server. The graphic module 1013 includes different software components for providing and displaying graphics on the touchscreen 1080. The graphics include texts, web pages, icons, digital images, videos, and animation.

The UI module 1014 includes different software components related to a user interface. Through the user interface module, the electronic device provides information about how the state of a user interface changes and/or information about under what condition the state of a user interface changes. The codec module 1015 may include software components related to video file encoding/decoding. The codec module may include a video stream module such as an MPEG module or an H204 module. Also, the codec module may include different audio file codec modules such as AAA, AMR, and WMA. The camera module 1016 may include camera-related software components that enable camera-related processes and functions. The application module 1017 includes a browser application, an e-mail application, an instant message application, a word processing application, a keyboard emulation application, an address book application, a touch list application, a widget application, a digital right management (DRM) application, a voice recognition application, a voice replication application, a position determining function application, a location-based service (LBS) application, for example.

While the system has been shown and described with reference to certain exemplary embodiments thereof, it will be understood by those skilled in the art that different changes in form and details may be made therein as defined by the appended claims. The above-described embodiments can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

What is claimed is:

1. A method for use by an electronic device receiving a geo-fence service, comprising:
   if a serving cell information is changed, switching to a wake-up mode from an idle mode, wherein the idle mode consumes less power than the wake-up mode;
   in response to switching the wake-up mode from the idle mode, determining whether a current position of the electronic device determined using a cellular positioning system (CPS) is located within a first distance from a central point of a geo-fence service area;
   if it is determined that the current position is located within the first distance, determining whether the current position is located within a second distance from the central point of the geo-fence service area in which the second distance is closer from the central point of the geo-fence service area than the first distance using a Wi-Fi positioning system (WPS);
   in response to the determination the current position is located within the second distance, determining whether the current position calculated using a global positioning system (GPS), is located within a boundary of the geo-fence service area; and
   if it is determined that the current position is located outside the first distance, switching the idle mode from the wake-up mode.

2. The method of claim 1, further comprising:
   determining whether the serving cell information of a cell Previously serving information to the electronic device matches an item of cell information of one or more base stations located within the geo-fence service area; and
   in response to a match, displaying information indicating that the electronic device is located within the geo-fence service area.

3. The method of claim 1, further comprising:
   determining whether the serving cell information matches an item of cell information of one or more base stations located within the geo-fence service area; and
   in response to an absence of a match, indicating that the serving cell information does not match.

4. The method of claim 1, further comprising:
   switching to an idle mode when it is determined that the current position is located outside of the first distance;
   in the idle mode, determining whether the serving cell information is changed; and
   in response to a determined change, switching to a wake-up mode from the idle mode.

5. The method of claim 1, further comprising, in response to determining that the current position calculated using the WPS is located outside of the second distance, repeatedly performing step (1).

6. The method of claim 1, further comprising, in response to determining that the current position calculated using the GPS is located outside of a boundary of the geo-fence service area, repeatedly performing step (2).

7. The method of claim 1, further comprising, in response to determining that the current position calculated using the GPS is located within the boundary of the geo-fence service area, displaying information indicating that the electronic device is located within the geo-fence service area.

8. An electronic device which receives a geo-fence service, comprising:
   one or more processors;
   a communication module;
   a memory; and
   one or more programs, wherein the one or more programs are stored in the memory and configured to be executed by the one or more processors, the programs comprising instructions for:
   if a serving cell information is changed, switching to a wake-up mode from an idle mode, wherein the idle mode consumes less power than the wake-up mode;
   in response to switching the wake-up mode from the idle mode, determining whether a current position calculated using a cellular positioning system (CPS)

is located within a first distance from a central point of a geo-fence service area, if it is determined that the current position is located within the first distance, determining whether the current position is located within a second distance from the central point of the geo-fence service area in which the second distance is closer from the central point of the geo-fence service area than the first distance using a Wi-Fi positioning system (WPS), in response to the determination the current position is located within the second distance, determining whether the current position calculated using a global positioning system (GPS), is located within a boundary of the geo-fence service area, and if it is determined that the current position is located outside the first distance, switching the idle mode from the wake-up mode.

9. The electronic device of claim 8, further comprising a touchscreen, and wherein the one or more programs further comprises instructions for:

displaying, on the touchscreen, information indicating that the electronic device is located within the geo-fence service area in response to determining that serving cell information matches an item of cell information of one or more base stations located within the geo-fence service area, determining whether the serving cell information matches an item of cell information of one or more base stations located within the geo-fence service area.

10. The electronic device of claim 8, wherein the one or more programs further comprises instructions for determining whether serving cell information matches an item of cell information of one or more base stations located within the geo-fence service area, and in response to an absence of a match of the serving cell information and the base station cell information, indicating the absence of a match.

11. The electronic device of claim 8, wherein the one or more programs further comprises instructions for switching to an idle mode and determining whether serving cell information is changed in response to determining that the current position is located outside of the first distance, switches to a wake-up mode from the idle mode in response to determining that the serving cell information is changed, and repeatedly performing determination of whether the current position calculated using the CPS is located within the first distance from a central point of the geo-fence service area.

12. The electronic device of claim 8, wherein the one or more programs further comprises instructions for repeatedly performing determination of whether the current position calculated using the CPS is located within the first distance from the central point of the geo-fence service area in response to determining that the current position calculated using the WPS is located outside of the second distance.

13. The electronic device of claim 8, wherein the one or more programs further comprises instructions for repeatedly performing determination of whether the current position calculated using the WPS is located within the second distance from the central point of the geo-fence service area in response to determining that a current position calculated using a GPS is located outside of a boundary of the geo-fence service area.

14. The electronic device of claim 8, further comprising a touchscreen, and wherein the one or more programs further comprises instructions for displaying, on the touchscreen, information indicating that the electronic device is located within the geo-fence service area when it is determined that the current position calculated using the GPS is located within the boundary of the geo-fence service area.

* * * * *